United States Patent
Nie (10) Patent No.: US 12,021,704 B2
(45) Date of Patent: Jun. 25, 2024

(54) INTERACTION METHOD FOR ESTABLISHING DEVICE LINKAGE SCENE, STORAGE MEDIUM, AND ELECTRONIC DEVICE

(71) Applicant: GREE ELECTRIC APPLIANCES, INC. OF ZHUHAI, Zhuhai (CN)

(72) Inventor: Yiling Nie, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 0 days.

(21) Appl. No.: 18/147,909

(22) Filed: Dec. 29, 2022

(65) Prior Publication Data

US 2023/0139553 A1 May 4, 2023

Related U.S. Application Data (63) Continuation of application No. PCT/CN2021/099985, filed on Jun. 15, 2021.

(30) Foreign Application Priority Data

Jul. 29, 2020 (CN) .......................... 202010744183.3

(51) Int. Cl.
   *H04L 41/12* (2022.01)
   *H04L 41/14* (2022.01)

(52) U.S. Cl.
   CPC ............ *H04L 41/12* (2013.01); *H04L 41/145* (2013.01)

(58) Field of Classification Search
   CPC ....... H04L 41/12; H04L 41/145; H04L 41/22; Y02P 90/02; G05B 19/418; G05B 15/02;
   (Continued)

(56) References Cited

U.S. PATENT DOCUMENTS

2014/0067131 A1  3/2014 Park et al.
2014/0378994 A1  12/2014 Wang
(Continued)

FOREIGN PATENT DOCUMENTS

CN       1758292 A    4/2006
CN    101848237 A    9/2010
(Continued)

OTHER PUBLICATIONS

First Office Action issued in counterpart Chinese Patent Application No. 202010744183.3, dated Apr. 30, 2021.
(Continued)

*Primary Examiner* — Emmanuel L Moise
*Assistant Examiner* — Zia Khurshid
(74) *Attorney, Agent, or Firm* — Westbridge IP LLC (57) ABSTRACT

An interaction method for establishing a device linkage scene includes: in a displayed schematic diagram of a network configuration scene including electrical devices configured in a same network, selecting electrical devices in turn through a connecting line to form a connection track; setting a triggering sequence of linking the electrical devices in a linkage scene represented by the connection track according to a connection sequence; selecting an electrical device on the connection track and setting an operating parameter of the electrical device in the linkage scene; and finally saving relevant information of the linkage scene. In this way, objectives of an intuitive display, simply and quickly setting a linkage scene, and improving user experience are achieved, linkage operation steps are reduced, and a user may conveniently and quickly set a smart home linkage.

14 Claims, 7 Drawing Sheets

(58) Field of Classification Search
CPC ........... G05B 2219/2642; G06F 3/0481; G06F 3/04847; G06F 3/0488
See application file for complete search history.

(56) References Cited

U.S. PATENT DOCUMENTS

| | | | | |
|---|---|---|---|---|
| 2017/0097621 | A1* | 4/2017 | Ackmann | ............... G05B 15/02 |
| 2017/0223808 | A1* | 8/2017 | Barna | ................. H05B 47/115 |

FOREIGN PATENT DOCUMENTS

| | | |
|---|---|---|
| CN | 105334810 A | 2/2016 |
| CN | 107733750 A | 2/2018 |
| CN | 107972033 A | 5/2018 |
| CN | 108196456 A | 6/2018 |
| CN | 208122502 U | 11/2018 |
| CN | 110456649 A | 11/2019 |
| CN | 110673505 A | 1/2020 |
| CN | 110687805 A | 1/2020 |
| CN | 110895009 A | 3/2020 |
| CN | 110971675 A | 4/2020 |
| CN | 110989391 A | 4/2020 |
| CN | 111142398 A | 5/2020 |
| CN | 111198511 A | 5/2020 |
| CN | 111880501 A | 11/2020 |
| EP | 2975590 A1 | 1/2016 |
| EP | 3016318 A1 | 5/2016 |
| EP | 3145125 A1 | 3/2017 |
| JP | 2007213474 A | 8/2007 |

OTHER PUBLICATIONS

International Search Report issued in corresponding PCT Application No. PCT/CN2021/099985, dated Sep. 17, 2021.
Written Opinion issued in corresponding PCT Application No. PCT/CN2021/099985, dated Sep. 17, 2021.
European Search Report issued in counterpart European Patent Application No. EP 21850679.8, dated Dec. 12, 2023.

* cited by examiner

| When any electrical device on a connection track in the schematic diagram of the network configuration scene is selected, detecting a touch duration required when the electrical device is selected | — Step 31 |

| Determining, based on a result of comparison between the touch duration and a preset time threshold, whether to set the operation mode used when the electrical device is triggered or to set the operation triggering condition of the electrical device | — Step 32 |

FIG. 3a

| When the operation mode used when the electrical device is triggered is to be set, displaying a control interface of the electrical device, to set, by using the control interface, the operation mode used when the electrical device is triggered | — Step 321 |

| When the operation triggering condition of the electrical device is to be set, displaying a triggering condition setting interface of the electrical device; and if the triggering condition includes the timing triggering condition, setting a start time of the electrical device; or if the triggering condition includes the environmental triggering condition, setting a startup environment condition parameter of the electrical device | — Step 322 |

FIG. 3b

| When any electrical device on a connection track in the schematic diagram of the network configuration scene is selected, detecting a touch duration required when the electrical device is selected | — Step 31 |

| Determining, based on a result of comparison between the touch duration and a preset time threshold, whether to set the operation mode used when the electrical device is triggered or to set the operation triggering condition of the electrical device | — Step 32 |

| When the operation mode used when the electrical device is triggered is to be set, displaying a control interface of the electrical device, to set, by using the control interface, the operation mode used when the electrical device is triggered | — Step 33 |

| When the operation triggering condition of the electrical device is to be set, displaying a triggering condition setting interface of the electrical device; and if the triggering condition includes the timing triggering condition, setting a start time of the electrical device; or if the triggering condition includes the environmental triggering condition, setting a startup environment condition parameter of the electrical device | — Step 34 |

INTERACTION METHOD FOR ESTABLISHING DEVICE LINKAGE SCENE, STORAGE MEDIUM, AND ELECTRONIC DEVICE

CROSS-REFERENCE TO RELATED APPLICATIONS

The present application is a continuation application of International Application No. PCT/CN2021/099985 filed on Jun. 15, 2021, which claims priority to Chinese Patent Application No. 202010744183.3 filed on Jul. 29, 2020. Both applications are incorporated herein by reference in their entireties.

TECHNICAL FIELD

The present disclosure relates to the technical field of smart home linkages, and in particular, to an interaction method for establishing a device linkage scene, a storage medium, and an electronic device.

BACKGROUND

As the social economy develops, smart home categories continuously grow, and smart home applications (APP) and smart home control terminals gain widespread popularity, to win the favor of users in the complex smart home market, smart home products are required to meet a plurality of scene requirements, and a plurality of linkage modes can be implemented between products, to meet various different requirements of the users. Various different application scenarios are implemented through cooperation between products. That is, a smart home linkage is implemented.

The smart home linkage is not simply to control a smart product or to set a smart scene mode, but to make at least two smart home products directly related. Inferences about other cases can be drawn from one condition. When one product is activated, another product accordingly responds. While the smart home linkage is implemented, quick response operations and improvement of user experience become a current main development direction of the smart home APPs and the smart home control terminals.

Currently, when a linkage between the smart home products is to be set and smart products are to be selected on most of the smart home APPs or the smart home control terminals, the smart products are displayed in a text form. In such a manner, identifiability is low and display is not intuitive enough, especially when there may be a plurality of products of a same category in a family, it is difficult to distinguish which product is specifically controlled. In addition, as smart devices and smart home products increase, more smart home products are used in a family, leading to an increase in amount of information displayed when the smart products are selected. If a manner, in related technologies, of setting a linkage between smart home products is adopted, the user needs to set linkage relationships and linkage conditions of the products one by one when selecting linkage products. Consequently, the setting process is cumbersome with excessive page jumps, inefficient, and time-consuming, thereby affecting user experience.

Therefore, based on the foregoing problems, the present disclosure provides an interaction method for establishing a device linkage scene intuitively, efficiently, and quickly, a storage medium, and an electronic device.

SUMMARY

Objectives of the present disclosure are as follows: For the foregoing problems, the present disclosure provides an interaction method for establishing a device linkage scene, a storage medium, and an electronic device. Electrical devices are selected in turn in a schematic diagram of a network configuration scene and are connected to form a connection track as a linkage scene. In this way, problems in a current interaction method for setting a smart home linkage that display is not intuitive enough and a setting process is cumbersome, inefficient, and time-consuming are solved, and objectives of an intuitive display, simply and quickly setting the linkage scene, and improving user experience are achieved.

Technical solutions used in the present disclosure are as follows:

To implement the foregoing objectives, according to a first aspect, the present disclosure provides an interaction method for establishing a device linkage scene, including the following steps:

displaying a schematic diagram of a network configuration scene including electrical devices configured in a same network;

adding, when operation information that a connection track is formed by connecting a plurality of electrical devices in the schematic diagram of the network configuration scene is obtained, the electrical devices on the connection track to a linkage scene represented by the connection track, and setting, according to a connection sequence of the electrical devices on the connection track, a triggering sequence of linking the electrical devices in the linkage scene;

providing a parameter setting interface of any electrical device on the connection track in the schematic diagram of the network configuration scene when operation information that the electrical device is selected is obtained, to set an operating parameter of the electrical device in the linkage scene represented by the connection track; and saving the triggering sequence of linking the electrical devices in the linkage scene represented by the connection track and operating parameters of the electrical devices in the linkage scene as relevant information of the linkage scene.

Based on the embodiments of the present disclosure, in some implementations, in the interaction method for establishing a device linkage scene, setting the operating parameter of the electrical device in the linkage scene represented by the connection track includes:

setting an operation mode used when the electrical device is triggered in the linkage scene represented by the connection track; and/or setting a triggering condition of the electrical device in the linkage scene represented by the connection track, where the triggering condition includes a timing triggering condition and/or an environmental triggering condition.

Based on the embodiments of the present disclosure, in some implementations, in the interaction method for establishing a device linkage scene, the providing a parameter setting interface of any electrical device on the connection track in the schematic diagram of the network configuration scene when operation information that the electrical device is selected is obtained includes:

when the operation information that the electrical device on the connection track in the schematic diagram of the network configuration scene is selected is obtained, detecting touch duration used when the electrical device is selected; and determining, based on a result of comparison between the touch duration and a preset time threshold, whether to provide an operation mode setting interface of the electrical device or to provide a triggering condition setting interface of the electrical device.

Based on the embodiments of the present disclosure, in some implementations, the interaction method for establishing a device linkage scene, further includes:

when it is determined to provide the triggering condition setting interface of the electrical device, if a triggering condition includes a timing triggering condition, providing an option for setting a start time of the electrical device; or if the triggering condition includes an environmental triggering condition, providing an option for setting a startup environment condition parameter of the electrical device.

Based on the embodiments of the present disclosure, in some implementations, in the interaction method for establishing a device linkage scene, the schematic diagram of the network configuration scene includes a plurality of partitions, and different partitions are used to display electrical devices located in different areas; and the adding, when operation information that a connection track is formed by connecting a plurality of electrical devices in the schematic diagram of the network configuration scene is obtained, the electrical devices on the connection track to a linkage scene represented by the connection track includes:

when operation information that a cross-partition connection track is formed by connecting a plurality of electrical devices located in different partitions in the schematic diagram of the network configuration scene is obtained, adding the electrical devices on the connection track to a cross-partition linkage scene represented by the connection track.

Based on the embodiments of the present disclosure, in some implementations, in the interaction method for establishing a device linkage scene, in a schematic diagram of a network configuration scene, connection tracks corresponding to different linkage scenes are displayed by using lines in different colors and/or forms.

Based on the embodiments of the present disclosure, in some implementations, in the interaction method for establishing a device linkage scene, the method further includes:

indicating different linkage scenes by using different scene labels;

when operation information that an identification of a newly added electric appliance configured in a same network but not belonging to the linkage scene is added to a scene label of the linkage scene is obtained, adding the newly added electric appliance to the linkage scene, setting the newly added electric appliance to a last electrical device in the linkage scene for linkage, and providing a parameter setting interface of the newly added electric appliance; and updating relevant information of an original linkage scene based on a triggering sequence of linking the newly added electric appliance and an operating parameter of the newly added electric appliance.

Based on the embodiments of the present disclosure, in some implementations, the interaction method for establishing a device linkage scene further includes: indicating different linkage scenes by using different scene labels;

when operation information that an identification of a newly added electric appliance configured in a same network but not belonging to the linkage scene is added to a scene label of the linkage scene is obtained, displaying a schematic diagram of a network configuration scene including the newly added electric appliance and electrical devices on a connection track corresponding to the linkage scene;

when operation information that a new connection track is formed by connecting the electrical devices and the newly added electric appliance that are in the schematic diagram of the network configuration scene is obtained, adding the newly added electric appliance to the linkage scene, setting, according to a connection sequence of the electrical devices and the newly added electric appliance that are on the new connection track, a triggering sequence of linking the electrical devices and the newly added electric appliance that are in the linkage scene, and providing a parameter setting interface of the newly added electric appliance; and updating relevant information of an original linkage scene based on the triggering sequence of linking the electrical devices and the newly added electric appliance and an operating parameter of the newly added electric appliance.

According to a second aspect, the present disclosure provides a storage medium, where a computer program is stored in the storage medium, and when the computer program is executed by one or more processors, the foregoing interaction method for establishing a device linkage scene is implemented.

According to a third aspect, the present disclosure provides an electronic device, where the electronic device includes a memory and a processor, a computer program is stored in the memory, and when the computer program is executed by the processor, the foregoing interaction method for establishing a device linkage scene is performed.

Compared with a related technology, one or more embodiments in the foregoing solutions may have the following advantages or beneficial effects:

1. The present disclosure provides an interaction method for establishing a device linkage scene, a storage medium, and an electronic device. In a displayed schematic diagram of a network configuration scene including electrical devices, electrical devices are selected in turn through a connecting line to form a connection track. A triggering sequence of linking the electrical devices in a linkage scene represented by the connection track is set according to a connection sequence. An electrical device on the connection track is selected and an operating parameter of the electrical device in the linkage scene is set. The triggering sequence of linking the electrical devices and the operating parameter are finally saved as relevant information of the linkage scene. Based on the schematic diagram of the network configuration scene, a smart product is displayed to a user visually and intuitively. The electrical devices are selected in turn through a connecting line, so that the plurality of electrical devices in the same network can be added to one linkage scene once, and the triggering sequence of linking the electrical devices in the linkage scene is further set according to the connection sequence. When there are a plurality of electrical devices to be linked, the triggering sequence of linking the electrical devices may be more quickly set through a connecting line without a plurality of page jumps. In this way, linkage operation steps are reduced, and a user may conveniently and quickly set a smart home linkage, thereby effectively saving time for the user and improving an effect of user experience.

2. The schematic diagram of the network configuration scene in the present disclosure includes a plurality of partitions, and different partitions are used to display electrical devices located in different areas. In this way, home products of a same category located in different areas are conveniently selected, so that electrical devices in a plurality of rooms can be added to a same linkage scene, and a corresponding electrical device is found quickly and directly without a page jump, thereby reducing operation steps and an operation time.
3. In a schematic diagram of a network configuration scene in the present disclosure, connection tracks corresponding to different linkage scenes are displayed by using lines in different colors and/or forms. In this way, a plurality of displayed connection tracks are conveniently distinguished in a schematic diagram of a network configuration scene, and display is more intuitive and clearer, thereby facilitating identifying linkage scenes represented by the plurality of connection tracks, and facilitating subsequent update and viewing.
4. In the present disclosure, different linkage scenes are indicated by using different scene labels. When it is monitored that an identification of a newly added electric appliance is added to a scene label of a linkage scene, the newly added electric appliance is directly added following a last electrical device on an original connection track for linkage, and relevant information of the linkage scene is updated. In this way, another electrical device is newly added subsequently, conveniently, and quickly, without repeatedly setting a triggering sequence of linking other electrical devices in an original linkage scene and operating parameters of the other electrical devices, thereby reducing steps of newly adding the electric appliance during setting of a smart home linkage, and further improving an effect of user experience.
5. In the present disclosure, different linkage scenes are indicated by using different scene labels. When it is monitored that an identification of a newly added electric appliance is added to a scene label of a linkage scene, in a schematic diagram of a network configuration scene, electrical devices on an original connection track and the newly added electric appliance are connected to form a new connection track, the newly added electric appliance is added among the electrical devices on the original connection track for linkage, and relevant information of the linkage scene is updated. In this way, another electrical device is inserted and newly added subsequently, conveniently, and quickly, without repeatedly setting operating parameters of other electrical devices in an original linkage scene, thereby reducing steps of newly adding the electric appliance during setting of a smart home linkage, and further improving an effect of user experience.

BRIEF DESCRIPTION OF THE DRAWINGS

The present disclosure is described below in more detail based on embodiments with reference to the accompanying drawings.

FIG. 3b is a schematic flowchart of Step 32 in an interaction method for establishing a device linkage scene according to an embodiment of the present disclosure.

FIG. 3c is a schematic flowchart of Step 3 in an interaction method for establishing a device linkage scene according to another embodiment of the present disclosure.

In the accompanying drawings, same components use same reference signs, and the accompanying drawings are not drawn to scale.

DETAILED DESCRIPTIONS OF THE EMBODIMENTS

Implementations of the present disclosure are described below in detail with reference to the accompanying drawings and embodiments, so that an implementation process of how to solve a technical problem by using a technical means and to achieve a corresponding technical effect in the present disclosure can be fully understood and implemented accordingly. The embodiments of the present disclosure and features in the embodiments may be combined with each other under the premise of no conflict, and formed technical solutions all fall within the protection scope of the present disclosure.

Embodiment 1

With reference to FIG. 1 to FIG. 6, this embodiment provides an interaction method, applicable to an electronic device, for establishing a device linkage scene. In a schematic flowchart shown in FIG. 1, the following steps are performed when the method is applied to the electronic device.

Figure 1:
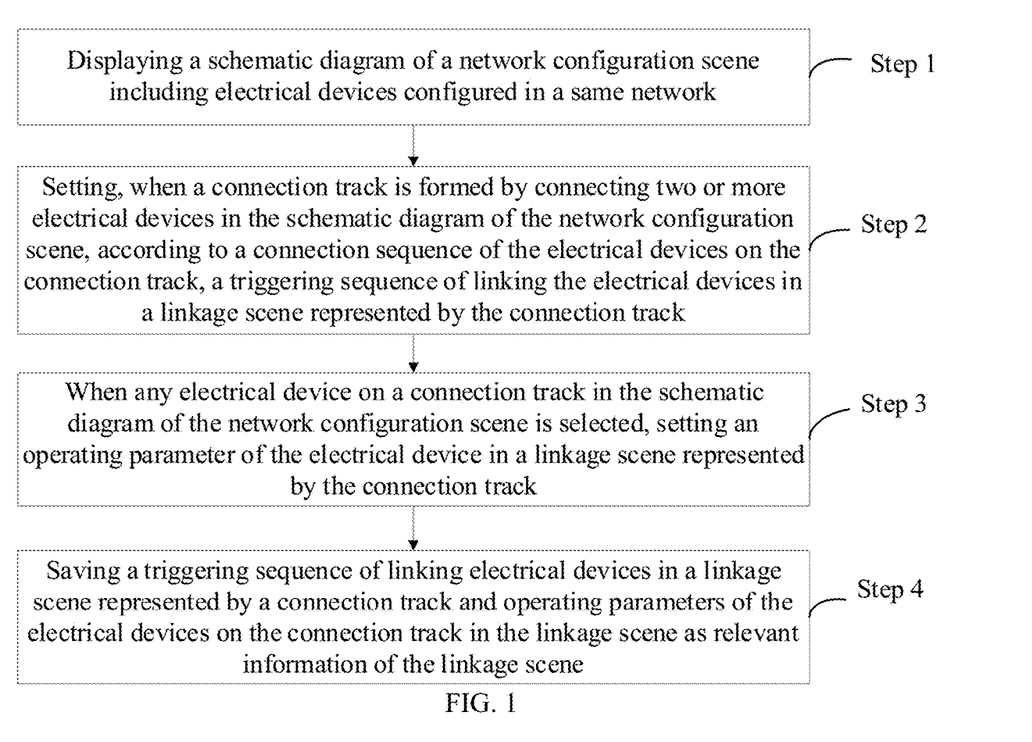
FIG. 1 is a schematic flowchart of an interaction method for establishing a device linkage scene according to Embodiment 1 of the present disclosure.

Step 1: Displaying a schematic diagram of a network configuration scene including electrical devices configured in a same network.

In this embodiment, before a smart home linkage is to be set, on a smart home APP, if all electrical devices that may be controlled by the smart home APP in a same network, for example, in same Bluetooth or Wi-Fi, in a network configuration family are successfully connected and belong to the same network, network configuration succeeds.

Enter a management page, and click "New linkage" to enter a newly created linkage interface. In this way, a smart home linkage may be set for electrical devices for which network configuration succeeds. For example, in a rainy day, a user wants to first remove air pollutants in a room for purification, perform dehumidification after purification, and turn on an air conditioner after dehumidification. That is, a linkage between a purifier, a dehumidifier, and the air conditioner needs to be set.

The newly created linkage interface displays a schematic diagram of a network configuration scene including the electrical devices for which network configuration succeeds, and specifically, the schematic diagram of a network configuration scene may be a schematic diagram of a physical rendering scene of the electrical devices. Each electrical device has a corresponding physical rendering diagram that is stored in a background database. Physical rendering diagrams corresponding to electrical devices for which network configuration succeeds are pulled up and displayed together in a schematic diagram of a physical rendering scene. In this embodiment, a schematic diagram of a physical rendering scene including the purifier, the dehumidifier, and the air conditioner is displayed.

Figure 2:
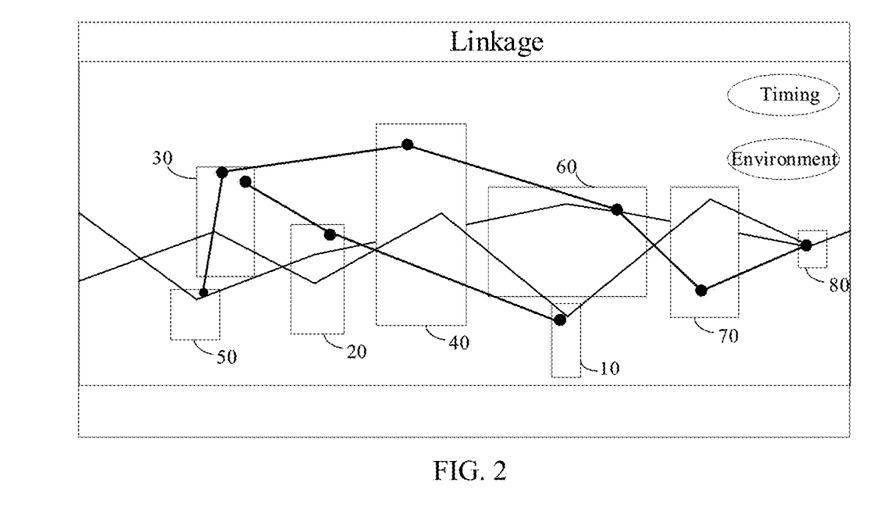
FIG. 2 is a schematic diagram of a connection track formed in Step 2 in an interaction method for establishing a device linkage scene according to Embodiment 1 of the present disclosure.

Specifically, as shown in FIG. 2, in the schematic diagram of a network configuration scene, there are many electrical devices, such as a purifier 10, a dehumidifier 20, an air conditioner 30, a refrigerator 40, an electric cooker 50, a television 60, a washing machine 70 and other electrical device 80.

Step 2: Setting, when a connection track is formed by connecting two or more electrical devices in the schematic diagram of the network configuration scene, according to a connection sequence of the electrical devices on the connection track, a triggering sequence of linking the electrical devices in a linkage scene represented by the connection track.

In this embodiment, in the schematic diagram of the physical rendering scene obtained in Step 1, sliding is performed to connect the purifier, the dehumidifier, and the air conditioner in turn. When a connecting line stops, the setting of a triggering sequence of the electrical devices in the linkage scene "rainy day" is completed. Whether the connected electrical devices are correct is then confirmed by using a pop-up window interface, that is, to confirm whether the connection sequence of the electrical devices on the connection track is the purifier, the dehumidifier, and the air conditioner in sequence. If there is no error after confirmation, a connection track shown in FIG. 2 is formed. In this way, the triggering sequence of linking the electrical devices in the linkage scene "rainy day" represented by the connection track is the purifier, the dehumidifier, and the air conditioner in sequence.

Step 3: When any electrical device on a connection track in the schematic diagram of the network configuration scene is selected, setting an operating parameter of the electrical device in a linkage scene represented by the connection track.

The setting an operating parameter of the electrical device in a linkage scene represented by the connection track includes at least one of the following settings:

setting an operation mode used when the electrical device is triggered; and setting an operation triggering condition of the electrical device, where the operation triggering condition includes a timing triggering condition and/or an environmental triggering condition; the timing triggering condition is, for example, setting a start time of the electrical device or setting a running time of the electrical device; the environmental triggering condition is, for example, setting a threshold of an environmental factor such as a temperature, illuminance, or humidity in a room; and when a detection value of the environmental factor reaches a corresponding threshold, a corresponding electrical device is started or turned off.

Figure 3A:
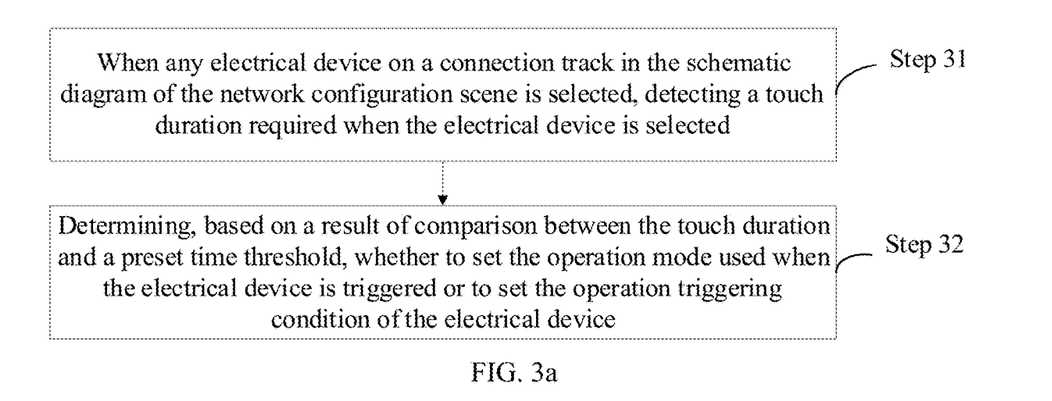
FIG. 3a is a schematic flowchart of Step 3 in an interaction method for establishing a device linkage scene according to an embodiment of the present disclosure.

In one embodiment, as shown in FIG. 3a, Step 3 includes the following steps.

Step 31: When any electrical device on a connection track in the schematic diagram of the network configuration scene is selected, detecting a touch duration required when the electrical device is selected.

Step 32: Determining, based on a result of comparison between the touch duration and a preset time threshold, whether to set the operation mode used when the electrical device is triggered or to set the operation triggering condition of the electrical device.

In this embodiment, when a touch duration required when an electrical device is selected ranges from 0.1 s to 1 s, it is determined that a light touch is performed on the electrical device. When the touch duration ranges from 1.1 s to 2 s, it is determined that a long press is performed on the electrical device. Correspondingly, a light touch on the electrical device may be used for setting an operation mode of the electrical device, and a long press on the electrical device may be used for setting an operation triggering condition of the electrical device.

In one embodiment, as shown in FIG. 3b, Step 32 includes the following steps.

Step 321: When the operation mode used when the electrical device is triggered is to be set, displaying a control interface of the electrical device, to set, by using the control interface, the operation mode used when the electrical device is triggered.

In this embodiment, operation modes of the purifier, the dehumidifier, and the air conditioner are to be set. A page jumps to a control interface of the purifier after a long press on the purifier for 1.5 s. After the operation mode used when the purifier is triggered is set to a PM2.5 purification mode, the page returns to the schematic diagram of the network configuration scene. Then, the page jumps to a control interface of the dehumidifier after a long press on the dehumidifier for 1.5 s. After the operation mode used when the dehumidifier is triggered is set to a refreshing mode, the page returns to the schematic diagram of the network configuration scene. Next, the page jumps to a control interface of the air conditioner after a long press on the air conditioner for 1.5 s. After the operation mode used when the air conditioner is triggered is set to a heating mode, the page returns to the schematic diagram of the network configuration scene.

Step 322: When the operation triggering condition of the electrical device is to be set, displaying a triggering condition setting interface of the electrical device; and if the triggering condition includes the timing triggering condition, setting a start time of the electrical device; or if the triggering condition includes the environmental triggering condition, setting a startup environment condition parameter of the electrical device.

Figure 4:
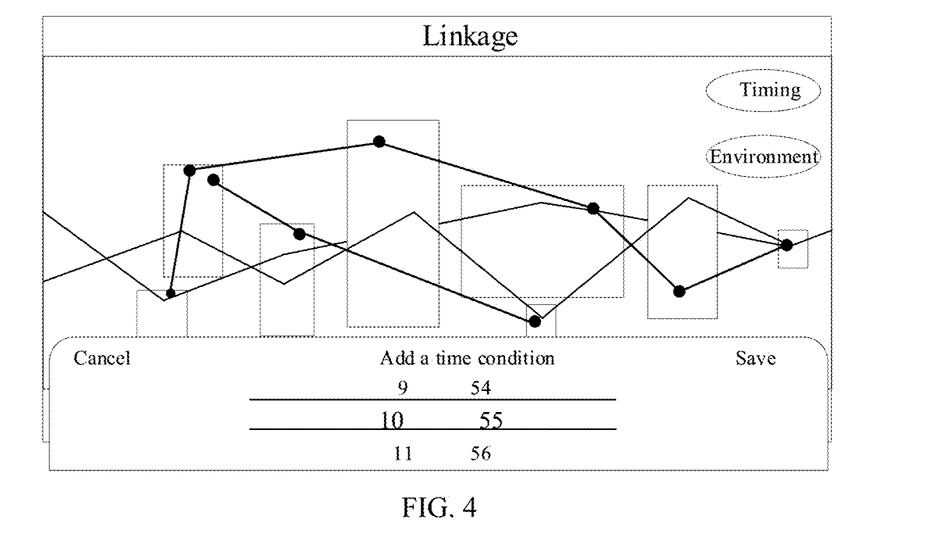
FIG. 4 is a schematic diagram of an interface for setting a timing triggering condition of an electrical device in Step 32 in an interaction method for establishing a device linkage scene according to Embodiment 1 of the present disclosure.

In this embodiment, operation triggering conditions of the purifier, the dehumidifier, and the air conditioner are to be set in turn. Timing triggering conditions of the purifier and the dehumidifier are first set, and then an environmental triggering condition of the air conditioner is set. FIG. 4 shows an interface for setting the timing triggering condition of the electrical device.

First, a start time of the purifier is to be set. After the purifier is lightly touched for 0.5 s, the start time of the purifier is set to 10:55 by using a bottom pop-up window interface. After the start time is saved, the interface returns to the schematic diagram of the network configuration scene.

Then a start time of the dehumidifier is to be set. After the dehumidifier is lightly touched for 0.5 s, the start time of the dehumidifier is set to 11:00 by using a bottom pop-up window interface. After the start time is saved, the interface then returns to the schematic diagram of the network configuration scene.

Next, the startup environment condition parameter of the air conditioner is to be set. After the air conditioner is lightly touched for 0.5 s, by using a page jump or a pop-up window interface, the air conditioner is set to be turned on and a heating mode is set to be run when an indoor temperature is lower than 10° C. After the setting is completed, the interface returns to the schematic diagram of the network configuration scene.

Figure 5:
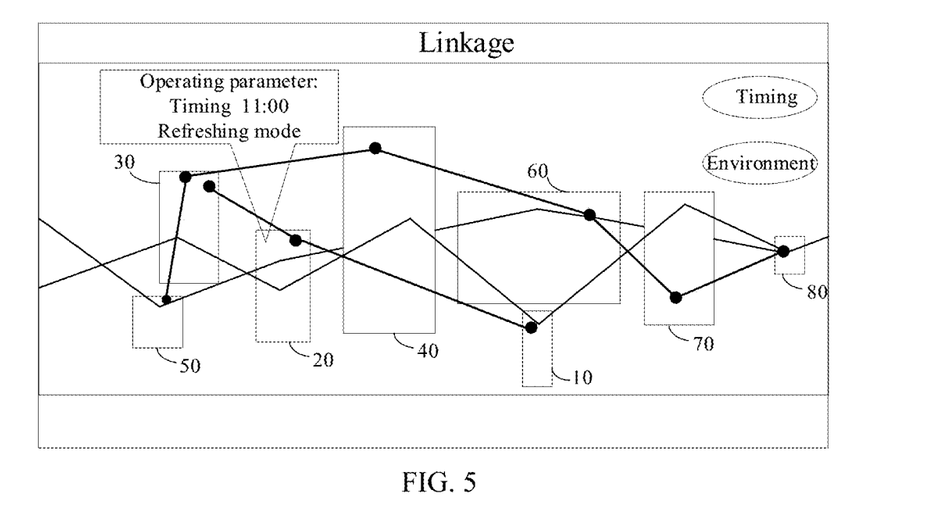
FIG. 5 is a schematic diagram of displaying an operating parameter of an electrical device in a linkage scene in an interaction method for establishing a device linkage scene according to Embodiment 1 of the present disclosure.

For an electrical device with an operating parameter set, the electrical device may be further lightly touched to check a current timing triggering condition in a linkage scene corresponding to a connection track to which the electrical device belongs, and the current timing triggering condition is displayed in a form of a small reminder box on the corresponding electrical device. For example, to check an operating parameter of the dehumidifier in the linkage scene in this embodiment, the dehumidifier on the connection track in the linkage scene is clicked, so that a display box of the operating parameter of the dehumidifier shown in FIG. 5 is displayed, and displayed content is that the refreshing mode of the dehumidifier is started at a timing of 11:00.

In this embodiment, a timing of the electrical device is set on the triggering condition setting interface instead of the control interface, of the electrical device, displayed when the operation mode is set, because the operation mode is adjusted by a user based on a habit of the user, and few changes are made after the operation mode is determined. However, a timing function is commonly used, and may be changed at any time. If the timing is set on the control interface, of the electrical device, displayed when the operation mode is set, the electrical device needs to be first long pressed to enter a setting phase of the operation mode. Then a page jumps to the control interface of the electrical device, and the timing is to be set. The process is relatively long and a plurality of interface jumps are required. Consequently, steps of setting the operating parameter of the electrical device in the linkage scene represented by the connection track are more complex. In this embodiment, the timing triggering condition is directly set by using the bottom pop-up window interface, and the steps are more concise and the setting is simpler.

Step 4: Saving a triggering sequence of linking electrical devices in a linkage scene represented by a connection track and operating parameters of the electrical devices on the connection track in the linkage scene as relevant information of the linkage scene.

Figure 6:
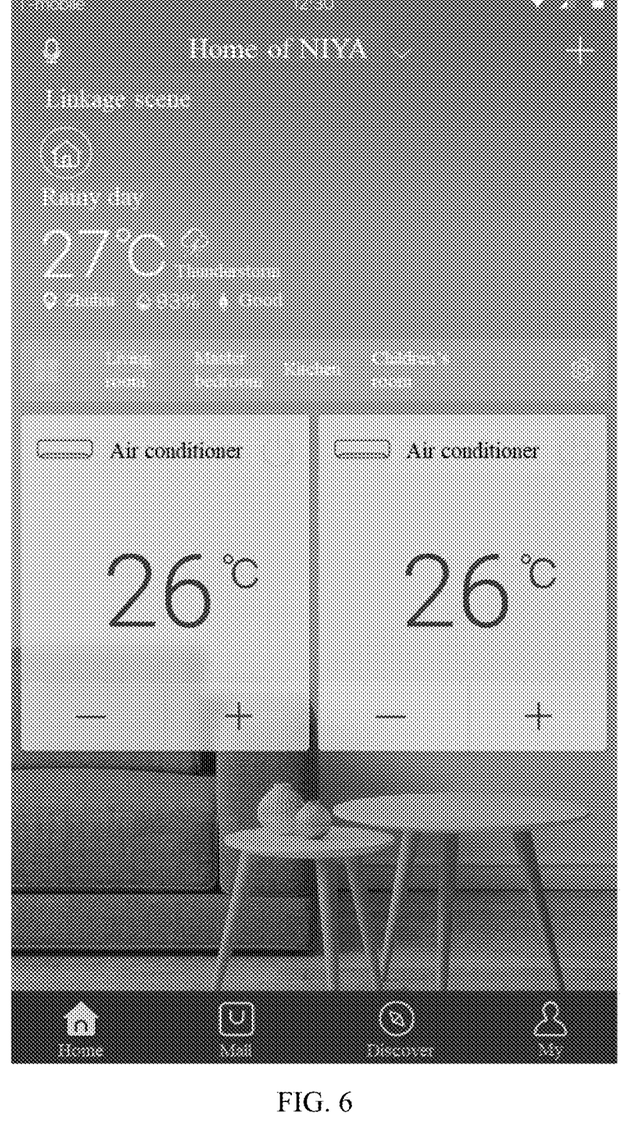
FIG. 6 is a schematic diagram of a display interface of a smart home application (APP) in Step 4 in an interaction method for establishing a device linkage scene according to Embodiment 1 of the present disclosure.

In this embodiment, on a display interface of the smart home APP shown in FIG. 6, after the foregoing triggering sequence of linking the electrical devices and the operating parameters that are set are saved for the linkage scene "rainy day", the linkage scene "rainy day" is displayed on the display interface of the smart home APP, and by clicking an icon "rainy day", linkage scene management can be entered.

In some implementations, the schematic diagram of the network configuration scene includes a plurality of partitions, and different partitions are used to display electrical devices located in different areas.

The setting, when a connection track is formed by connecting two or more electrical devices in the schematic diagram of the network configuration scene, according to a connection sequence of the electrical devices on the connection track, a triggering sequence of linking the electrical devices in a linkage scene represented by the connection track includes:

when a connection track is formed by connecting two or more electrical devices located in different partitions in the schematic diagram of the network configuration scene, setting, according to a connection sequence of the electrical devices on the connection track, a triggering sequence of linking electrical devices in a linkage scene represented by the connection track, to implement a cross-partition linkage. In this way, home products of a same category located in different areas are conveniently selected, so that electrical devices in a plurality of rooms may be added to a same linkage scene, and a corresponding electrical device may be found quickly and directly without a page jump, thereby reducing operation steps and an operation time.

In this embodiment, a schematic diagram of a network configuration scene is partitioned, and virtual backgrounds such as a living room, a bedroom, and a kitchen are used as scene partitions. When selecting same electrical devices located in different rooms, a user may quickly find the same electrical devices in only one page and perform selection through a connecting line to set a connection track. For example, there is an air conditioner in each of the living room and the bedroom. When both the air conditioners in the living room and the bedroom need to be set in one linkage scene, if the air conditioners are displayed in one page and without partition, it is uneasy to distinguish between the air conditioners. However, if the air conditioners are displayed in different partitions, the corresponding partition may be directly and quickly found without a page jump and the air conditioner in the partition may be selected.

In some implementations, in a schematic diagram of a network configuration scene, connection tracks corresponding to different linkage scenes are displayed by using lines in different colors and/or forms. In this way, a plurality of displayed connection tracks are conveniently distinguished in a schematic diagram of a network configuration scene, and display is more intuitive and clearer, thereby facilitating identifying linkage scenes represented by the plurality of connection tracks, and facilitating subsequent update and viewing.

For example, if a refrigerator belongs to two linkage scenes "be out" and "be home", a connection track corresponding to the linkage scene "be out" and a connection track corresponding to the linkage scene "be home" may be indicated by using lines in different colors, respectively.

According to the interaction method for establishing a device linkage scene provided in this embodiment, based on a schematic diagram of a network configuration scene, a smart product is displayed to a user visually and intuitively. Electrical devices are selected in turn through a connecting line, so that the plurality of electrical devices in a same network may be added to one linkage scene once, and a triggering sequence of linking the electrical devices in the linkage scene may be further set according to a connection sequence. When there are a plurality of electrical devices to be linked, the triggering sequence of linking the electrical devices may be more quickly set through a connecting line without a plurality of page jumps. In this way, linkage operation steps are reduced, and a user may conveniently and quickly set a smart home linkage, thereby effectively saving time for the user and improving an effect of user experience. In addition, objectives of an intuitive display, simply and quickly setting a linkage scene, and improving user experience are achieved, thus solving problems in the interaction method for setting a smart home linkage in a related technology that display is not intuitive enough and a setting process is cumbersome, inefficient, and time-consuming.

Embodiment 2

Based on Embodiment 1, this embodiment provides an interaction method, applicable to an electronic device, for establishing a device linkage scene. The method further includes the following steps.

Indicating different linkage scenes by using different scene labels; when it is monitored that an identification of a newly added electric appliance configured in a same network but not belonging to a linkage scene is added to a scene label of the linkage scene, setting the newly added electric appliance to be linked following a last electrical device on a connection track corresponding to the linkage scene, and setting an operating parameter in the linkage scene for the newly added electric appliance; and updating relevant information of an original linkage scene based on a triggering sequence of linking electrical devices in a linkage scene represented by a connection track on which the newly added electric appliance is located and the operating parameter of the newly added electric appliance.

Figure 7:
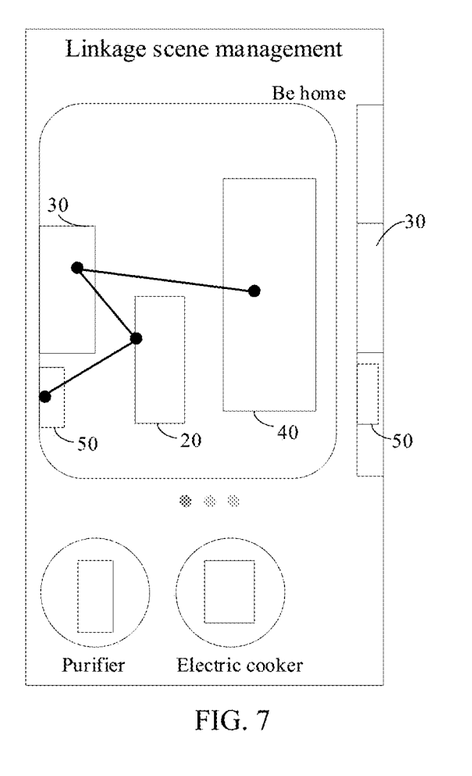
FIG. 7 is a schematic diagram of a display interface of linkage scene management in an interaction method for establishing a device linkage scene according to Embodiment 2 of the present disclosure.

In this embodiment, a linkage scene is indicated by using a card-type scene label, and a newly added electric appliance is indicated by using a rendering diagram identification. In a display interface of linkage scene management shown in FIG. 7, a current linkage triggering sequence of a linkage scene "be home" is a refrigerator 40, an air conditioner 30, and a dehumidifier 20 in turn. If a user wants to add an electric cooker to the linkage scene "be home", and start the electric cooker following the dehumidifier, the user may directly drag a rendering diagram identification of the electric cooker to a card-type scene label of the linkage scene. The electric cooker is linked following the dehumidifier by default. The linkage triggering sequence of the linkage scene "be home" becomes the refrigerator 40, the air conditioner 30, the dehumidifier 20, and the electric cooker 50 in turn. Then an operating parameter of the electric cooker may be set. Finally, relevant information of the original linkage scene "be home" may be updated.

In this embodiment, another electrical device is newly added subsequently, conveniently, and quickly, without repeatedly setting a triggering sequence of linking other electrical devices in the original linkage scene and operating parameters of the other electrical devices, thereby reducing steps of newly adding the electric appliance during setting of a smart home linkage, and further improving an effect of user experience.

Embodiment 3

Based on Embodiment 1, this embodiment provides an interaction method, applicable to an electronic device, for establishing a device linkage scene. The method further includes the following steps.

Indicating different linkage scenes by using different scene labels; when it is monitored that an identification of a newly added electric appliance configured in a same network but not belonging to a linkage scene is added to a scene label of the linkage scene, displaying a schematic diagram of a network configuration scene including the newly added electric appliance and electrical devices on a connection track corresponding to the linkage scene; when a new connection track is formed by connecting the electrical devices and the newly added electric appliance in the schematic diagram of the network configuration scene, setting a triggering sequence of linking electrical devices in a linkage scene represented by the new connection track according to a connection sequence of the electrical devices and the newly added electric appliance that are on the new connection track, and setting an operating parameter in the linkage scene for the newly added electric appliance; and updating relevant information of an original linkage scene based on the triggering sequence of linking the electrical devices in the linkage scene represented by the new connection track and the operating parameter of the newly added electric appliance in the linkage scene.

In this embodiment, a linkage scene is represented by using a card-type scene label, and a newly added electric appliance is indicated by using a rendering diagram identification. In a display interface of linkage scene management shown in FIG. 8, a current linkage triggering sequence of a linkage scene "be home" is a refrigerator 40, an air conditioner 30, and a dehumidifier 20 in turn. If a user wants to add an electric cooker to the linkage scene "be home", and start the electric cooker between the air conditioner and the dehumidifier, the user may click a card-type scene label of the linkage scene, to display a schematic diagram of a network configuration scene including the electric cooker and electrical devices on the connection track corresponding to the linkage scene "be home".

Figure 8:
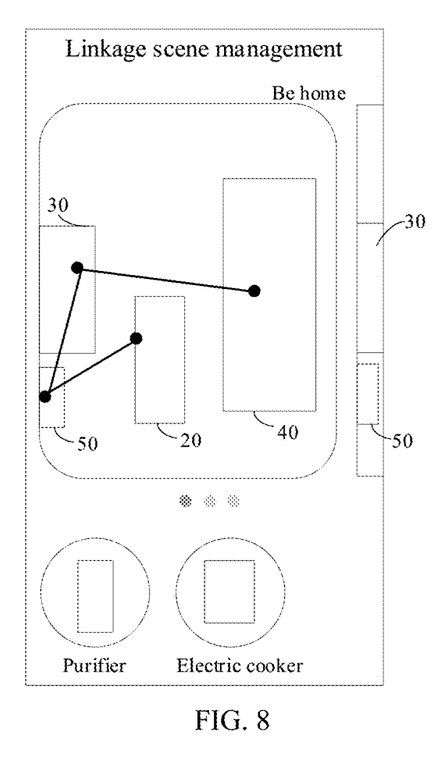
FIG. 8 is a schematic diagram of a display interface of linkage scene management in an interaction method for establishing a device linkage scene according to Embodiment 3 of the present disclosure.

In the foregoing schematic diagram of the network configuration scene, the refrigerator 40, the air conditioner 30, the electric cooker 50, and the dehumidifier 20 are connected in turn through sliding to form a new connection track. In this way, a triggering sequence of linking electrical devices in the linkage scene "be home" represented by the connection track is to trigger the refrigerator 40, the air conditioner 30, the electric cooker 50, and the dehumidifier 20 in turn. An operating parameter of the electric cooker may be then set. Next, relevant information of the original linkage scene "be home" may be updated.

In this embodiment, another electrical device is inserted and newly added subsequently, conveniently, and quickly, without repeatedly setting operating parameters of other electrical devices in an original linkage scene, thereby reducing steps of newly adding the electric appliance during setting of a smart home linkage, and further improving an effect of user experience.

Embodiment 4

This embodiment provides a computer-readable storage medium, such as a flash memory, a hard disk, a multimedia card, a card-type memory (such as an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, a server, or an application (APP) store. A computer program is stored in the computer-readable storage medium. When the computer program is executed by a processor, the following method steps may be performed.

Step 1: Displaying a schematic diagram of a network configuration scene including electrical devices configured in a same network.

Step 2: Setting, when a connection track is formed by connecting two or more electrical devices in the schematic diagram of the network configuration scene, according to a connection sequence of the electrical devices on the connection track, a triggering sequence of linking the electrical devices in a linkage scene represented by the connection track.

Step 3: When any electrical device on a connection track in the schematic diagram of the network configuration scene is selected, setting an operating parameter of the electrical device in a linkage scene represented by the connection track, where the setting an operating parameter of the electrical device in a linkage scene represented by the connection track includes at least one of the following settings:

setting an operation mode used when the electrical device is triggered; and setting an operation triggering condition of the electrical device, where the operation triggering condition includes a timing triggering condition and/or an environmental triggering condition.

In one embodiment, as shown in FIG. 3c, Step 3 includes the following steps.

Step 31: When any electrical device on a connection track in the schematic diagram of the network configuration scene is selected, detecting a touch duration required when the electrical device is selected.

Step 32: Determining, based on a result of comparison between the touch duration and a preset time threshold, whether to set the operation mode used when the electrical device is triggered or to set the operation triggering condition of the electrical device.

Step 33: When the operation mode used when the electrical device is triggered is to be set, displaying a control interface of the electrical device, to set, by using the control interface, the operation mode used when the electrical device is triggered.

Step 34: When the operation triggering condition of the electrical device is to be set, displaying a triggering condition setting interface of the electrical device; and if the triggering condition includes the timing triggering condition, setting a start time of the electrical device; or if the triggering condition includes the environmental triggering condition, setting a startup environment condition parameter of the electrical device.

Step 4: Saving a triggering sequence of linking electrical devices in a linkage scene represented by a connection track and operating parameters of the electrical devices on the connection track in the linkage scene as relevant information of the linkage scene.

For a process of a specific embodiment of the steps of the foregoing method, reference may be made to Embodiment 1. Details are not described repeatedly in this embodiment.

Embodiment 5

This embodiment provides an electronic device. The electronic device may be a mobile phone, a computer, a tablet computer, or the like, and includes a memory and a processor. A computer program is stored in the memory. When the computer program is executed by the processor, the interaction method for establishing a device linkage scene in Embodiment 1 is implemented. It may be understood that the electronic device may further include a multimedia component, an input/output (I/O) interface, and a communication component.

The processor is configured to perform all or part of the steps in the interaction method for establishing a device linkage scene in Embodiment 1. The memory is configured to store various types of data. The data may include, for example, instructions for any application program or any method in the electronic device, and data related to the application program.

The processor may be implemented by an application-specific integrated circuit (ASIC for short), a digital signal processor (DSP for short), a digital signal processing device (DSPD for short), a programmable logic device (PLD for short), a field programmable gate array (FPGA for short), a controller, a microcontroller, a microprocessor, or another electronic element, and is configured to perform the interaction method for establishing a device linkage scene in Embodiment 1.

The memory may be implemented by any type of volatile or non-volatile storage device or a combination thereof, such as a static random access memory (SRAM for short), an electrically erasable programmable read-only memory (EEPROM for short), an erasable programmable read-only memory (EPROM for short), a programmable read-only memory (PROM for short), a read-only memory (ROM for short), a magnetic memory, a flash memory, a magnetic disk, or an optical disc.

The multimedia component may include a screen and an audio component. The screen may be a touch screen, and the audio component is configured to output and/or input an audio signal. For example, the audio component may include one microphone configured to receive an external audio signal. The received audio signal may be further stored in the memory or sent by using the communication component. The audio component further includes at least one speaker configured to output an audio signal.

The I/O interface provides an interface between the processor and another interface module, and the foregoing another interface module may be a keyboard, a mouse, a button, or the like. The button may be a virtual button or a physical button.

The communication component is configured to perform wired or wireless communication between the electronic device and another device. The wireless communication is, for example, Wi-Fi, Bluetooth, near field communication (NFC for short), 2G, 3G, or 4G, or one or a combination thereof. Therefore, the corresponding communication component may include: a Wi-Fi module, a Bluetooth module, and an NFC module.

To sum up, the present disclosure provides an interaction method for establishing a device linkage scene, a storage medium, and an electronic device. In a displayed schematic diagram of a network configuration scene including electrical devices, electrical devices are selected in turn through a connecting line to form a connection track. A triggering sequence of linking the electrical devices in a linkage scene represented by the connection track is set according to a connection sequence. An electrical device on the connection track is selected and an operating parameter of the electrical device in the linkage scene is set. The triggering sequence of linking the electrical devices and the operating parameter are finally saved as relevant information of the linkage scene. Based on the schematic diagram of the network configuration scene, a smart product is displayed to a user visually and intuitively. The electrical devices are selected in turn through a connecting line, so that the plurality of electrical devices in a same network may be added to one linkage scene once, and the triggering sequence of linking the electrical devices in the linkage scene is further set according to the connection sequence. When there are a plurality of electrical devices to be linked, the triggering sequence of linking the electrical devices may be more quickly set through a connecting line without a plurality of page jumps. In this way, linkage operation steps are reduced, and a user may conveniently and quickly set a smart home linkage, thereby effectively saving time for the user and improving an effect of user experience.

It should be noted that because the accompanying drawings in the specification are not allowed to be colored or altered, it is difficult to show some parts with an obvious difference in the accompanying drawings of the present disclosure. If necessary, color pictures can be provided.

In the several embodiments provided in the embodiments of the present disclosure, it should be understood that, the disclosed system and method may alternatively be implemented in another manner. The embodiments of the foregoing described system and method are merely examples.

It should be noted that in this specification, the term "comprise", "include", or any other variant thereof is intended to cover a non-exclusive inclusion, so that a process, a method, an article, or a device that includes a list of elements not only includes those elements, but also includes other elements that are not expressly listed, or further includes elements inherent to such process, method, article, or device. Without being subject to further limitations, an element defined by a phrase "including one . . . " does not exclude presence of other identical elements in the process, method, article, or device that includes the element.

Although the implementations disclosed by the present disclosure are described above, the contents described are merely implementations used for ease of understanding the present disclosure, and are not intended to limit the present disclosure. Anyone skilled in the technical field to which the present disclosure belongs can make any modification and change in the implementation forms and details without departing from the spirit and scope disclosed by the present disclosure, but the patent protection scope of the present disclosure shall still be subject to the scope defined in the appended claims.

What is claimed is:

1. An interaction method for establishing a device linkage scene, comprising the following steps:
    displaying a schematic diagram of a network configuration scene comprising electrical devices configured in a same network;
    adding, when operation information that a connection track is formed by connecting a plurality of electrical devices displayed in the schematic diagram of the network configuration scene is obtained, the electrical devices on the connection track to a same linkage scene represented by the connection track, and setting, according to a connection sequence of the electrical devices on the connection track, a triggering sequence of linking the electrical devices in the linkage scene;
    providing a parameter setting interface of any electrical device on the connection track in the schematic diagram of the network configuration scene when operation information that the electrical device is selected is obtained, to set an operating parameter of the electrical device in the linkage scene represented by the connection track; and
    wherein setting the operating parameter of the electrical device in the linkage scene represented by the connection track comprises:
    setting an operation mode used when the electrical device is triggered in the linkage scene represented by the connection track;
    when the operation information that the electrical device on the connection track in the schematic diagram of the network configuration scene is selected is obtained, detecting touch duration used when the electrical device is selected;
    determining, based on a result of comparison between the touch duration and a preset time threshold, whether to provide an operation mode setting interface of the electrical device or to provide a triggering condition setting interface of the electrical device; and
    saving the triggering sequence of linking the electrical devices in the linkage scene represented by the connection track and operating parameters of the electrical devices in the linkage scene as relevant information of the linkage scene.

2. The interaction method for establishing a device linkage scene according to claim 1, wherein setting the operating parameter of the electrical device in the linkage scene represented by the connection track further comprises:
    setting an operation mode used when the electrical device is triggered in the linkage scene represented by the connection track; and
    setting a triggering condition of the electrical device in the linkage scene represented by the connection track, wherein the triggering condition comprises a timing triggering condition and/or an environmental triggering condition.

3. The interaction method for establishing a device linkage scene according to claim 1, further comprising: wherein when it is determined to provide the triggering condition setting interface of the electrical device, if a triggering condition comprises a timing triggering condition, providing an option for setting a start time of the electrical device; or if the triggering condition comprises an environmental triggering condition, providing an option for setting a startup environment condition parameter of the electrical device.

4. The interaction method for establishing a device linkage scene according to claim 1, wherein the schematic diagram of the network configuration scene comprises a plurality of partitions, and different partitions are used to display electrical devices located in different areas; and
    the adding, when operation information that a connection track is formed by connecting a plurality of electrical devices in the schematic diagram of the network configuration scene is obtained, the electrical devices on the connection track to a linkage scene represented by the connection track comprises:
    when operation information that a cross-partition connection track is formed by connecting a plurality of electrical devices located in different partitions in the schematic diagram of the network configuration scene is obtained, adding the electrical devices on the connection track to a cross-partition linkage scene represented by the connection track.

5. The interaction method for establishing a device linkage scene according to claim 1, wherein in a schematic diagram of a network configuration scene, connection tracks corresponding to different linkage scenes are displayed by using lines in different colors and/or forms.

6. The interaction method for establishing a device linkage scene according to claim 1, wherein the method further comprises:
- indicating different linkage scenes by using different scene labels;
- when operation information that an identification of a newly added electric appliance configured in a same network but not belonging to the linkage scene is added to a scene label of the linkage scene is obtained, adding the newly added electric appliance to the linkage scene, setting the newly added electric appliance to a last electrical device in the linkage scene for linkage, and providing a parameter setting interface of the newly added electric appliance; and
- updating relevant information of an original linkage scene based on a triggering sequence of linking the newly added electric appliance and an operating parameter of the newly added electric appliance.

7. The interaction method for establishing a device linkage scene according to claim 1, wherein the method further comprises:
- indicating different linkage scenes by using different scene labels;
- when operation information that an identification of a newly added electric appliance configured in a same network but not belonging to the linkage scene is added to a scene label of the linkage scene is obtained, displaying a schematic diagram of a network configuration scene comprising the newly added electric appliance and electrical devices on a connection track corresponding to the linkage scene;
- when operation information that a new connection track is formed by connecting the electrical devices and the newly added electric appliance that are in the schematic diagram of the network configuration scene is obtained, adding the newly added electric appliance to the linkage scene, setting, according to a connection sequence of the electrical devices and the newly added electric appliance that are on the new connection track, a triggering sequence of linking the electrical devices and the newly added electric appliance that are in the linkage scene, and providing a parameter setting interface of the newly added electric appliance; and
- updating relevant information of an original linkage scene based on the triggering sequence of linking the electrical devices and the newly added electric appliance and an operating parameter of the newly added electric appliance.

8. The interaction method for establishing a device linkage scene according to claim 1, wherein the schematic diagram of the network configuration scene comprises a schematic diagram of a physical rendering scene of the electrical devices, and physical rendering diagrams corresponding to the electrical devices are displayed together in the schematic diagram of the physical rendering scene.

9. A non-transitory storage medium, wherein a computer program is stored in the non-transitory storage medium, and when the computer program is executed by one or more processors, the interaction method for establishing a device linkage scene is implemented, wherein the interaction method for establishing a device linkage scene comprises:
- displaying a schematic diagram of a network configuration scene comprising electrical devices configured in a same network;
- adding, when operation information that a connection track is formed by connecting a plurality of electrical devices displayed in the schematic diagram of the network configuration scene is obtained, the electrical devices on the connection track to a same linkage scene represented by the connection track, and setting, according to a connection sequence of the electrical devices on the connection track, a triggering sequence of linking the electrical devices in the linkage scene;
- providing a parameter setting interface of any electrical device on the connection track in the schematic diagram of the network configuration scene when operation information that the electrical device is selected is obtained, to set an operating parameter of the electrical device in the linkage scene represented by the connection track; and
- wherein setting the operating parameter of the electrical device in the linkage scene represented by the connection track comprises:
- setting an operation mode used when the electrical device is triggered in the linkage scene represented by the connection track;
- when the operation information that the electrical device on the connection track in the schematic diagram of the network configuration scene is selected is obtained, detecting touch duration used when the electrical device is selected;
- determining, based on a result of comparison between the touch duration and a preset time threshold, whether to provide an operation mode setting interface of the electrical device or to provide a triggering condition setting interface of the electrical device; and
- saving the triggering sequence of linking the electrical devices in the linkage scene represented by the connection track and operating parameters of the electrical devices in the linkage scene as relevant information of the linkage scene.

10. An electronic device, wherein the electronic device comprises a memory and a processor, a computer program is stored in the memory, and when the computer program is executed by the processor, the interaction method for establishing a device linkage scene is implemented, wherein the interaction method for establishing a device linkage scene comprises:
- displaying a schematic diagram of a network configuration scene comprising electrical devices configured in a same network;
- adding, when operation information that a connection track is formed by connecting a plurality of electrical devices displayed in the schematic diagram of the network configuration scene is obtained, the electrical devices on the connection track to a same linkage scene represented by the connection track, and setting, according to a connection sequence of the electrical devices on the connection track, a triggering sequence of linking the electrical devices in the linkage scene;
- providing a parameter setting interface of any electrical device on the connection track in the schematic diagram of the network configuration scene when operation information that the electrical device is selected is obtained, to set an operating parameter of the electrical device in the linkage scene represented by the connection track; and
- wherein setting the operating parameter of the electrical device in the linkage scene represented by the connection track comprises:
- setting an operation mode used when the electrical device is triggered in the linkage scene represented by the connection track;

when the operation information that the electrical device on the connection track in the schematic diagram of the network configuration scene is selected is obtained, detecting touch duration used when the electrical device is selected;

determining, based on a result of comparison between the touch duration and a preset time threshold, whether to provide an operation mode setting interface of the electrical device or to provide a triggering condition setting interface of the electrical device; and saving the triggering sequence of linking the electrical devices in the linkage scene represented by the connection track and operating parameters of the electrical devices in the linkage scene as relevant information of the linkage scene.

11. The electronic device according to claim 10, wherein setting the operating parameter of the electrical device in the linkage scene represented by the connection track further comprises:

setting an operation mode used when the electrical device is triggered in the linkage scene represented by the connection track; and setting a triggering condition of the electrical device in the linkage scene represented by the connection track, wherein the triggering condition comprises a timing triggering condition and/or an environmental triggering condition.

12. The electronic device according to claim 10, wherein the interaction method for establishing a device linkage scene further comprising: wherein comprises: when it is determined to provide the triggering condition setting interface of the electrical device, if a triggering condition comprises a timing triggering condition, providing an option for setting a start time of the electrical device; or if the triggering condition comprises an environmental triggering condition, providing an option for setting a startup environment condition parameter of the electrical device.

13. The electronic device according to claim 10, wherein the schematic diagram of the network configuration scene comprises a plurality of partitions, and different partitions are used to display electrical devices located in different areas; and the adding, when operation information that a connection track is formed by connecting a plurality of electrical devices in the schematic diagram of the network configuration scene is obtained, the electrical devices on the connection track to a linkage scene represented by the connection track comprises:

when operation information that a cross-partition connection track is formed by connecting a plurality of electrical devices located in different partitions in the schematic diagram of the network configuration scene is obtained, adding the electrical devices on the connection track to a cross-partition linkage scene represented by the connection track.

14. The electronic device according to claim 10, wherein the interaction method for establishing a device linkage scene further comprises:

indicating different linkage scenes by using different scene labels;

when operation information that an identification of a newly added electric appliance configured in a same network but not belonging to the linkage scene is added to a scene label of the linkage scene is obtained, adding the newly added electric appliance to the linkage scene, setting the newly added electric appliance to a last electrical device in the linkage scene for linkage, and providing a parameter setting interface of the newly added electric appliance; and updating relevant information of an original linkage scene based on a triggering sequence of linking the newly added electric appliance and an operating parameter of the newly added electric appliance.

* * * * *